US012078485B2

(12) United States Patent
Kimishima

(10) Patent No.: US 12,078,485 B2
(45) Date of Patent: Sep. 3, 2024

(54) INFORMATION PROCESSING APPARATUS AND INFORMATION PROCESSING METHOD

(71) Applicant: SONY GROUP CORPORATION, Tokyo (JP)

(72) Inventor: Masato Kimishima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 354 days.

(21) Appl. No.: 17/608,898

(22) PCT Filed: Feb. 28, 2020

(86) PCT No.: PCT/JP2020/008244
§ 371 (c)(1),
(2) Date: Nov. 4, 2021

(87) PCT Pub. No.: WO2020/230406
PCT Pub. Date: Nov. 19, 2020

(65) Prior Publication Data
US 2022/0316883 A1    Oct. 6, 2022

(30) Foreign Application Priority Data
May 16, 2019    (JP) ................. 2019-092961

(51) Int. Cl.
| G01C 21/16 | (2006.01) |
| G01P 13/00 | (2006.01) |
| G06F 21/62 | (2013.01) |
| H04W 4/029 | (2018.01) |
| H04W 12/30 | (2021.01) |

(52) U.S. Cl.
CPC .............. *G01C 21/16* (2013.01); *G01P 13/00* (2013.01); *G06F 21/62* (2013.01); *G06F 21/629* (2013.01); *H04W 4/029* (2018.02); *H04W 12/30* (2021.01)

(58) Field of Classification Search
CPC ........ G01C 21/16; G01P 13/00; H04W 4/029; H04W 12/30; G06F 21/62; G06F 21/629
See application file for complete search history.

(56) References Cited

U.S. PATENT DOCUMENTS

| 9,924,313 | B1 * | 3/2018 | Akselrod ................ H04W 4/33 |
| 2002/0090953 | A1 * | 7/2002 | Aburai .................. H04W 60/00 455/457 |
| 2013/0171970 | A1 | 7/2013 | Naiki et al. |

(Continued)

FOREIGN PATENT DOCUMENTS

| EP | 1223772 A1 | 7/2002 |
| JP | 2002-209243 A | 7/2002 |
| JP | 2004-343346 A | 12/2004 |

(Continued)

OTHER PUBLICATIONS

International Search Report and Written Opinion of PCT Application No. PCT/JP2020/008244, issued on Apr. 14, 2020, 09 pages of ISRWO.

*Primary Examiner* — Hee K Song
(74) *Attorney, Agent, or Firm* — CHIP LAW GROUP

(57) ABSTRACT

An information processing apparatus includes a control unit configured to restrict, on the basis of movement amount information obtained from a motion sensor, output of the movement amount information.

13 Claims, 18 Drawing Sheets

(56) References Cited

U.S. PATENT DOCUMENTS

2018/0338033 A1* 11/2018 Boule .................... G01S 19/52

FOREIGN PATENT DOCUMENTS

| JP | 2009-182656 A | 8/2009 |
| JP | 2013-110652 A | 6/2013 |
| JP | 2013-142915 A | 7/2013 |
| JP | 2016-167672 A | 9/2016 |

* cited by examiner

LARGE MAGNETISM CHANGE

LARGE ATMOSPHERIC PRESSURE AND
TEMPERATURE CHANGES

FIG. 12

| NAME OF BUILDING | LANDOWNER/ TENANT, LESSEE | LATITUDE (SOUTHWEST) END | LONGITUDE (SOUTHWEST) END | LATITUDE (NORTHEAST) END | LONGITUDE (NORTHEAST) END | FLOOR | MOVEMENT AMOUNT INFORMATION PUBLIC SETTING | REMARKS | DESCRIPTION |
|---|---|---|---|---|---|---|---|---|---|
| "abc" BUILDING | LANDOWNER OF BUILDING | 35.1234 | 139.1234 | 35.1237 | 139.1237 | -- | NG | OFFICE BUILDING, NO STORES | DISCLOSURE OF INTERNAL STRUCTURE TO PUBLIC IS NG BECAUSE OF OFFICE BUILDING |
| "cdf" RESIDENCE | LANDOWNER OF BUILDING | 35.2234 | 139.2234 | 35.2237 | 139.2237 | -- | NG | APARTMENT | DISCLOSURE OF INTERNAL STRUCTURE TO PUBLIC IS NG BECAUSE OF RESIDENCE USE. LANDOWNER IS RESIDENTS' UNION OR THE LIKE. |
|  | "mn" MART | 35.2235 | 139.2235 | 35.2235 | 139.2235 | 1F | OK | CONVENIENCE STORE | SINCE DISCLOSURE TO PUBLIC IS NG AS ENTIRE BUILDING, DISCLOSURE OF ONLY CONVENIENCE STORE TO PUBLIC IS NOT APPLIED |
| "ghi" SQUARE | LANDOWNER OF BUILDING | 35.3234 | 139.3234 | 35.3239 | 139.3239 | -- | OK | SHOPPING MALL | MAP IS ALREADY OPEN TO PUBLIC. NO DETAILED MAP FOR EACH STORE. |
|  | "op" CLINIC | -- | -- | -- | -- | 3F | NG | HOSPITAL | DISCLOSURE TO OPEN IS NG BECAUSE OF HOSPITAL |
| "jkl" PLAZA | LANDOWNER OF BUILDING | 35.4234 | 139.4234 | 35.4236 | 139.4236 | -- | OK | OFFICE AND STORE COMPLEX | DEPENDING ON JUDGEMENT FOR EACH TENANT. |
|  | "qr" PUBLISHING | -- | -- | -- | -- | 5F | NG | PUBLISHING COMPANY | DISCLOSURE OF ONLY 5F TO OPEN IS NG FROM VIEWPOINT OF CONFIDENTIALITY. |
|  | "st" CAMERA | 35.4236 | 139.4236 | 35.4236 | 139.4236 | 2F | OK | VOLUME-SALES ELECTRICAL APPLIANCE STORE | DESIRE POSITIVE DISCLOSURE TO OPEN FOR COMMODITIES GUIDANCE NAVIGATION. |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/008244 filed on Feb. 28, 2020, which claims priority benefit of Japanese Patent Application No. JP 2019-092961 filed in the Japan Patent Office on May 16, 2019. Each of the above-referenced applications is hereby incorporated herein by reference in its entirety.

TECHNICAL FIELD

The present disclosure relates to an information processing apparatus, an information processing method, and a program.

BACKGROUND ART

Patent Document 1 below describes a technology to output a signal of a sensor group, thereby sending a notice of a movement amount, as insurance against an accident such as an avalanche.

CITATION LIST

Patent Document

Patent Document 1: Japanese Patent Application Laid-Open No. 2013-142915

SUMMARY OF THE INVENTION

Problems to be Solved by the Invention

If the technology for an emergency situation described in Patent Document 1 is applied to daily life, there is a possibility that a history (a trajectory) of movements of a user in daily life is acquired by another malicious user.

An object of the present disclosure is to provide an information processing apparatus, an information processing method, and a program for appropriately restricting output of movement amount information.

Solutions to Problems

The present disclosure is directed to, for example,
an information processing apparatus including
a control unit configured to restrict, on the basis of movement amount information obtained from a motion sensor, output of the movement amount information.
The present disclosure is directed to, for example,
an information processing method including
causing a control unit to restrict, on the basis of movement amount information obtained from a motion sensor, output of the movement amount information.
The present disclosure is directed to, for example,
a program causing a computer to execute an information processing method including
causing a control unit to restrict, on the basis of movement amount information obtained from a motion sensor, output of the movement amount information.

BRIEF DESCRIPTION OF DRAWINGS

FIG. 12 is a diagram that illustrates an example of permission information according to the embodiment.

MODE FOR CARRYING OUT THE INVENTION

An embodiment and the like of the present disclosure will be described below with reference to the drawings. Note that the description is given in the following order.
<Problems to be Considered>

Embodiment

Modification

An embodiment and the like to be described below are preferred specific examples of the present disclosure, and the contents of the present disclosure are not limited to the embodiment and the like.
<Problems to be Considered>
First, a description will be given of problems to be considered in the present embodiment, in order to facilitate understanding of the present disclosure. Recently, mobile terminals, typified by popular smartphones, are often equipped with an inertial measurement unit (IMU). An IMU typically includes a three-axis gyro sensor and a three-axis acceleration sensor. Furthermore, a mobile terminal includes, as a positioning infrastructure, a global navigation satellite system (GNSS), Wi-Fi (registered trademark), and the like. If an external malicious user acquires an output from a positioning infrastructure and an output from an IMU and combines these information items, there is a possibility that the malicious user grasps a movement trajectory of a user of the mobile terminal. Furthermore, there is a possibility that the malicious user acquires a structure of a building treated with confidentiality, on the basis of the movement trajectory of the user. Moreover, there is a possibility that the malicious user acquires information regarding a user in the building, in addition to the structure of the building. For example, there is a possibility that the malicious user acquires information that users, who draw similar movement trajectories in the building, belong to the same department.

In order to address these problems, it is conceivable that output from a positioning infrastructure such as a GNSS is stopped. Such a method disables an application that utilizes position information of a mobile terminal, which may degrade the convenience of the mobile terminal. Furthermore, it is conceivable that utilization of information of an IMU is permitted for only a specific application. However, such a method is not realistic since it is necessary to examine applications one by one. Furthermore, if an examination of applications is strict, the number of developers is reduced. Therefore, there is a possibility that a platform side becomes passive to application development. Moreover, it is ultimately conceivable that a mobile terminal is impounded in a predetermined indoor area. However, such a method is not realistic. Hereinafter, a specific description will be given of an embodiment of the present disclosure made in view of these respects.

Embodiment

Configuration Example of Smartphone

Figure 1:
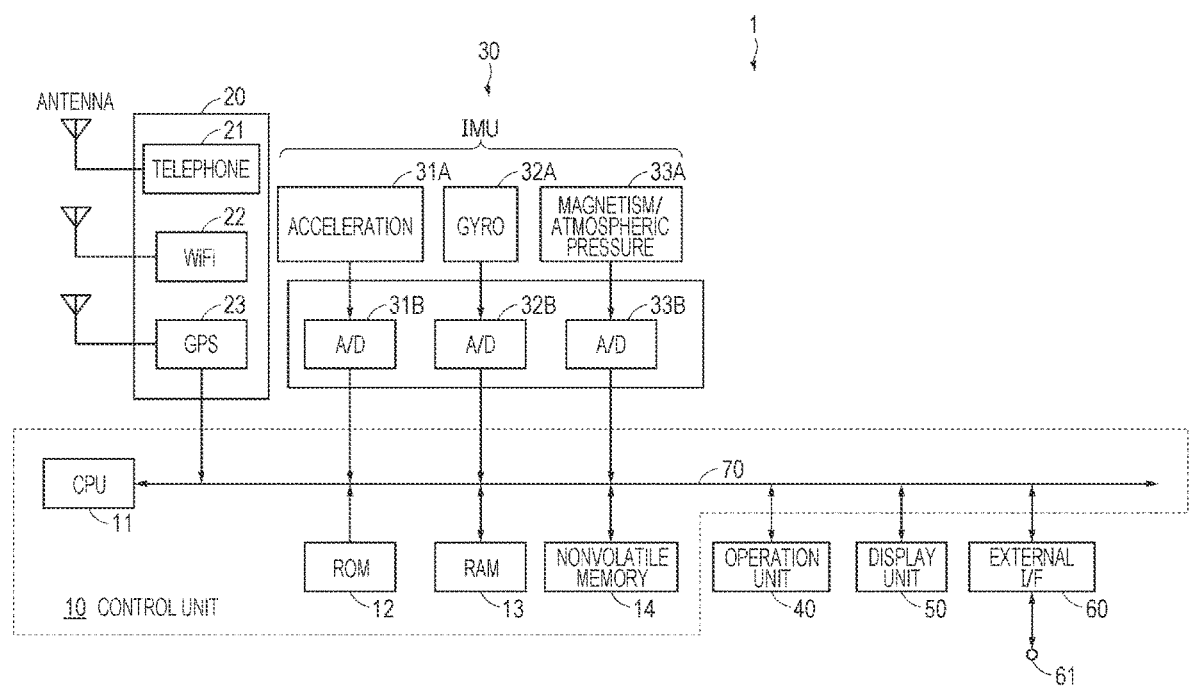
FIG. 1 is a block diagram that illustrates a configuration example of a smartphone according to the present embodiment.

In the present embodiment, a smartphone is described as an example of an information processing apparatus. FIG. 1 is a block diagram that illustrates a configuration example of a smartphone (a smartphone 1) according to the present embodiment. The smartphone 1 includes, for example, a control unit 10, a communication unit 20, an IMU 30, an operation unit 40, a display unit 50, and an external interface (I/F) 60. These configurations are interconnected via a bus 70.

The control unit 10 includes a central processing unit (CPU) 11, a read only memory (ROM) 12, a random access memory (RAM) 13, and a nonvolatile memory 14. The CPU 11 controls the respective units of the smartphone 1 in a centralized manner. For example, the CPU 11 restricts, on the basis of movement amount information obtained from a motion sensor, output of the movement amount information. The ROM 12 stores a program to be executed by the CPU 11. The RAM 13 is used as a working memory at the time when the CPU 11 executes the program. The nonvolatile memory 14 stores various kinds of data.

The communication unit 20 includes, as a functional block, a telephone unit 21, Wi-Fi 22, and a global positioning system (GPS) 23. These configurations are connected to antennas, respectively. The telephone unit 21 carries out processing that causes the smartphone 1 to make a phone call with another communication device. The Wi-Fi 22 carries out processing for communications based on a Wi-Fi function. The GPS 23 receives a signal from a GPS satellite. The communication unit 20 transmits and receives various kinds of data.

The IMU 30 includes a sensor that acquires various kinds of physical information. The IMU 30 according to the present embodiment includes an acceleration sensor 31A, a gyro sensor 32A, and a magnetism (geomagnetism)/atmospheric pressure sensor 33A. These sensors are integrated into one package corresponding to the IMU 30. Note that the acceleration sensor 31A and the gyro sensor 32A make up the IMU 30 in some cases. As described above, the types of sensors making up the IMU 30 are changeable as appropriate. Note that the motion sensor according to the present embodiment includes the sensors that make up the IMU 30 and the GPS 23. Other examples of the motion sensor may include visual simultaneous localization and mapping (VSLAM), light detection and ranging or laser imaging detection and ranging ((LiDAR)), GNSS, and the like.

Analog-to-digital (A/D) converters are connected to the respective sensors to convert sensing data, acquired by the sensors, from an analog format into a digital format. Specifically, an A/D converter 31B is connected to the acceleration sensor 31A, an A/D converter 32B is connected to the gyro sensor 32A, and an A/D converter 33B is connected to the magnetism/atmospheric pressure sensor 33A. The sensing data converted into the digital format by each A/D converter is supplied to the CPU 11 via the bus 70. For example, information output from the IMU 30 is used for detecting the length, the width, and the like of the smartphone 1.

The operation unit 40 accepts operation input of a user. Examples of the operation unit 40 may include a touch screen, a button, and the like. The operation unit 40 generates an operation signal according to the operation input. The operation signal generated by the operation unit 40 is supplied to the CPU 11 via the bus 70, and processing according to the operation signal is carried out by the CPU 11.

The display unit 50 displays various kinds of information and includes a display and a driver that causes the display to display various kinds of information. Examples of the display may include an organic electro luminescence (EL) display, a liquid crystal display (LCD), and the like.

The external I/F 60 is an interface with an external device. The external I/F 60 includes an external terminal 61. Data is exchanged between the smartphone 1 and the external device via the external terminal 61.

Example of Restricting Output from IMU

Meanwhile, a highly accurate movement trajectory is obtained from a combination of information obtained by the GPS 23 (information obtained by a positioning infrastructure) with information obtained by a non-positioning infrastructure, such as the IMU 30, which does not directly acquire position information. Furthermore, a position of a user is also known from a combination of map data with a value output from the IMU 30 or information based on the IMU 30 (e.g., an approximate movement trajectory obtained through the use of a value output from the IMU 30). According to the present disclosure, a movement trajectory of a user is prevented from being acquired by another user by appropriately controlling output of sensing data itself obtained from a motion sensor or a feature value calculated on the basis of the sensing data (hereinafter, they will be collectively referred to as movement amount information as appropriate). The movement amount information according to the present embodiment is, for example, a value output from the IMU 30 or information which, for example, the CPU 11 generates on the basis of the value output from the IMU 30.

Note that restricting output of movement amount information has a meaning that involves at least any of not outputting movement amount information to the outside of the smartphone 1, not generating movement amount information in the smartphone 1, using movement amount information only at a specific layer in the smartphone 1, or outputting invalidated movement amount information externally. Outputting invalidated movement amount information externally involves, for example, superimposing noise on movement amount information or intermittently outputting movement amount information, thereby outputting the movement amount information, which is made meaningless at a reception side, externally.

Figure 2:
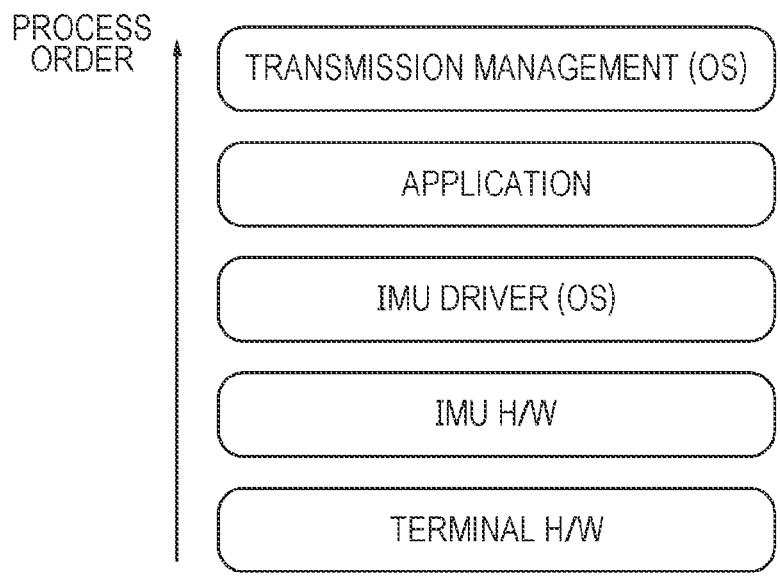
FIG. 2 is a diagram that illustrates an example of a process layer of the smartphone according to the present embodiment.

The processing of restricting output of movement amount information is carried out at an appropriate process layer of the smartphone 1 in accordance with control by the control unit (specifically, the CPU 11). FIG. 2 illustrates an example of a process layer of the smartphone 1. As an example, processing of restricting output of movement amount information is carried out by terminal hardware (H/W). Specifically, output of movement amount information is restricted in such a manner that the smartphone 1 is turned off.

As another example, the processing of restricting external output of movement amount information is carried out by the hardware of the IMU 30. Specifically, output of movement amount information is restricted in such a manner that the IMU 30 is turned off. Furthermore, the movement amount information may be invalidated with the accuracy of the movement amount information lowered in such a manner that the IMU 30 is intermittently operated although the IMU 30 is turned on. Furthermore, operations of some sensors (e.g., the magnetism/atmospheric pressure sensor 33A) of the IMU 30 may be stopped.

As still another example, the processing of restricting output of movement amount information is carried out by an IMU driver (an operating system (OS)). Specifically, processing of not sending movement amount information to an application in a specific area or processing of sending movement amount information to only a specific application is carried out.

As yet another example, the processing of restricting external output of movement amount information is carried out by an application. Specifically, processing of not generating movement amount information or generating movement amount information, but not transmitting the movement amount information externally is carried out.

As yet another example, the processing of restricting external output of movement amount information is carried out by an OS that manages transmission. Specifically, in a case where movement amount information is detected, the OS performs control so as not to transmit the movement amount information externally.

As described above, processing of restricting output of movement amount information is carried out at an appropriate process layer of the smartphone 1.

First Example

A first example of restricting output of movement amount information is an example of restricting, on the basis of movement amount information obtained from a motion sensor, output of the movement amount information. More specifically, the first example is an example of restricting output of movement amount information in a case where a certain movement from a reference position is detected on the basis of the movement amount information.

Figure 3:
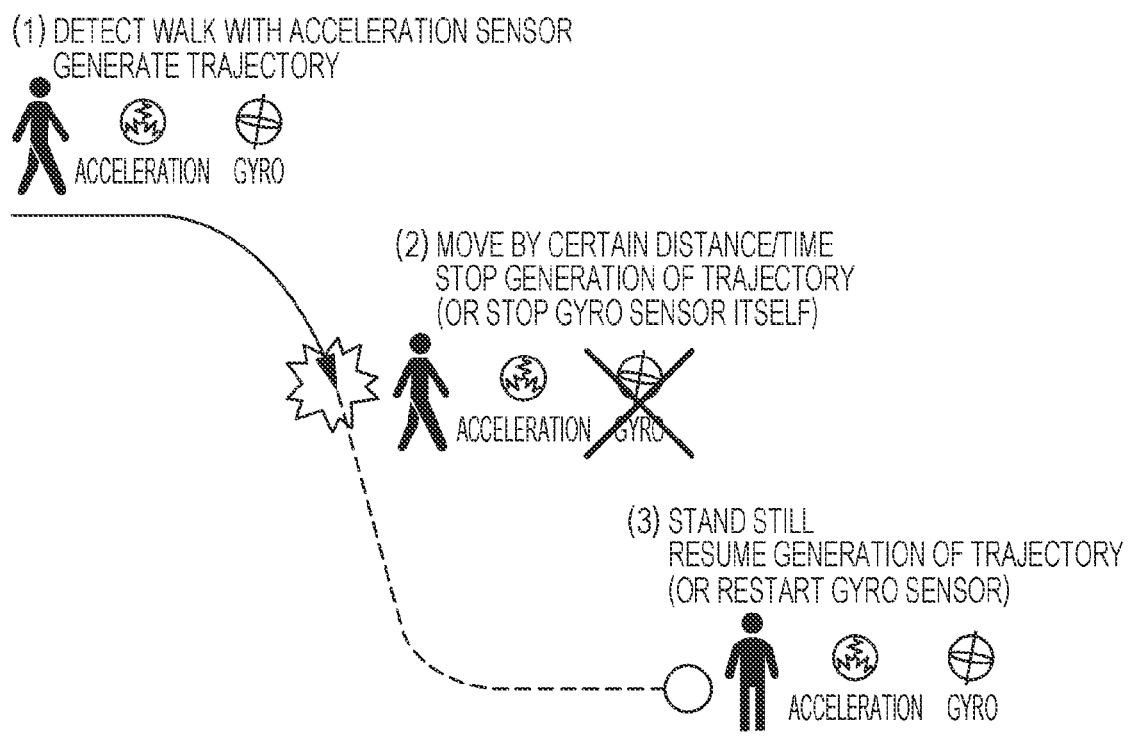
FIG. 3 is a diagram for reference in describing a first example of restricting output of movement amount information.

FIG. 3 is an explanatory diagram of the first example of restricting output of movement amount information. As illustrated in FIG. 3, for example, when the user who carries the smartphone 1 moves (walks), the smartphone 1 obtains movement amount information. Note that the movement amount information in this example is a trajectory of the user which the CPU 11 generates on the basis of a value output from the IMU 30.

A movement of the user by a certain distance is detected on the basis of the movement amount information. When such a movement of the user by a certain distance is detected, the processing of generating the trajectory by the CPU 11 is stopped. Alternatively, the operation of the gyro sensor 32A is stopped.

When the stop of the user is detected, the processing of generating the trajectory by the CPU 11 is resumed. Alternatively, the gyro sensor 32A is restarted.

Figure 4:
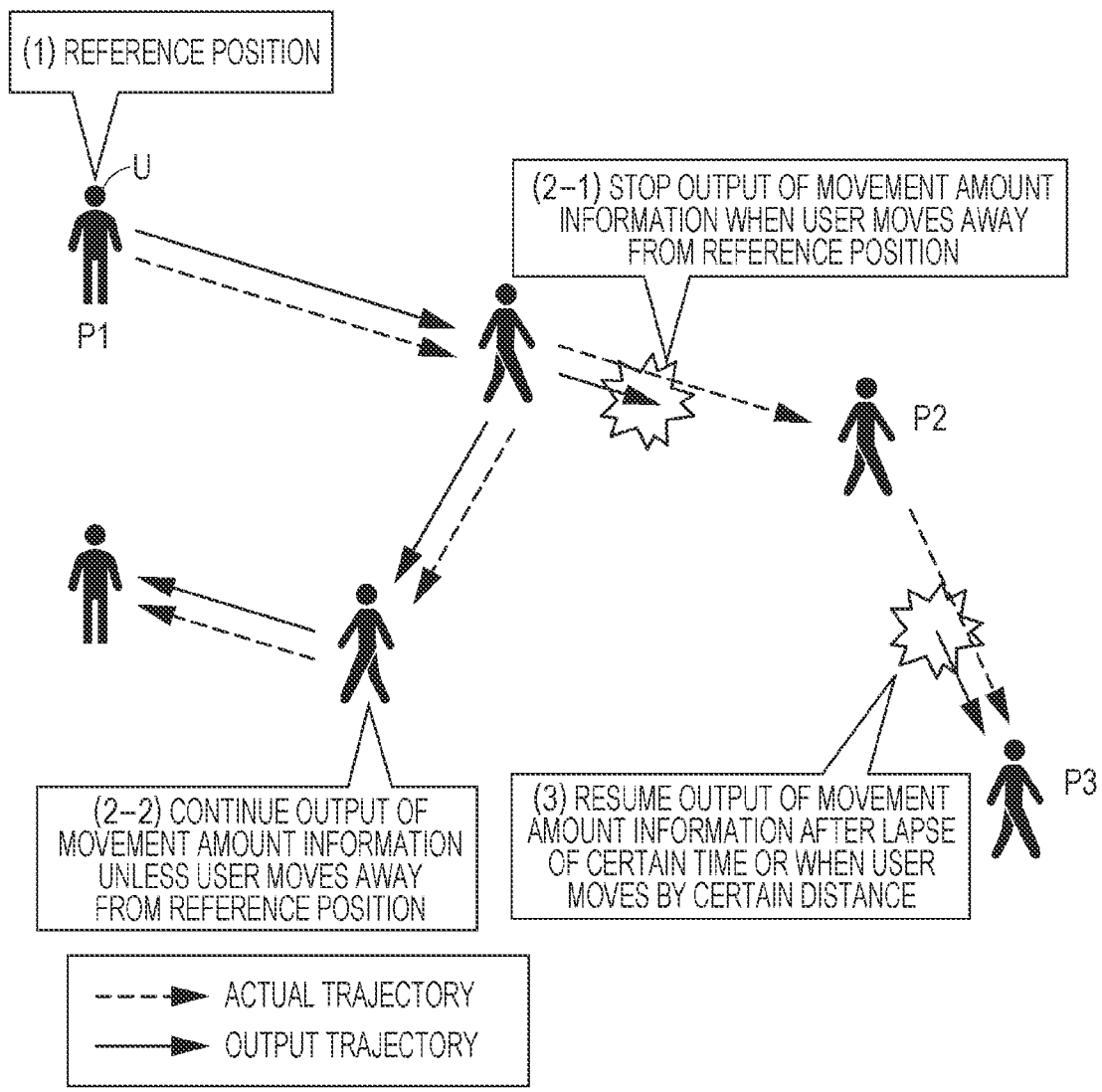
FIG. 4 is a diagram for reference in describing the first example of restricting output of movement amount information.

FIG. 4 is a diagram that specifically illustrates the first example of restricting external output of movement amount information. A predetermined reference position P1 is set. Any position can be set as the reference position P1. For example, a position to be detected when the smartphone 1 is turned on may be set as the reference position P1. Furthermore, the reference position P1 may be set by a user's operation.

A user U moves from the reference position P1. When a position of the moved user U is within a certain range (e.g., within 10 m) from the reference position P1, output of movement amount information is continued. In a case where a position of the moved user U is out of a certain range (e.g., a position P2 in FIG. 4) from the reference position P1, the output of the movement amount information is restricted (e.g., stopped). In a case where the user U moves from the position P2 toward a position P3 by a certain distance (e.g., 10 m) or a lapse of a certain time is detected, the output of the movement amount information is resumed.

While the output of the movement amount information (e.g., the output of the movement amount information to the outside of the smartphone 1) is restricted, information regarding a change of a position or an orientation is deleted. It is therefore impossible to connect a trajectory before the deletion and a trajectory after the deletion. It is accordingly possible to prevent the movement trajectory of the user U from being grasped by a malicious user.

Note that the IMU 30 may be incorporated in a head up display (HUD) or the like rather than the smartphone 1. In this case, processing concerning augmented reality (AR) or virtual reality (VR) may be carried out using information output from the IMU 30. Typically, the processing concerning AR or VR is carried out while a user stops. If the external output of the movement amount information is restricted at the time when the user stops, the processing concerning AR or VR is not appropriately carried out in some cases. For example, in a case where an inclination of the HUD is detected on the basis of the information output from the IMU 30 and display concerning AR or VR is achieved in accordance with the inclination, for example, if the external output of the movement amount information is restricted by the stop of the IMU 30, appropriate display is not achieved in some cases. Hence, in a case where the user stops after a movement of the user by a certain distance is detected, the restriction on the output of the movement amount information may be removed.

Second Example

A second example is an example of restricting output of movement amount information in a case where, in order to prevent a structure of an indoor area (an interior of a building) treated with higher confidentiality from being specified, it is detected that a user is present indoors, in other words, the smartphone 1 (including the motion sensor of the smartphone 1) of the user is present indoors.

Figure 5A:
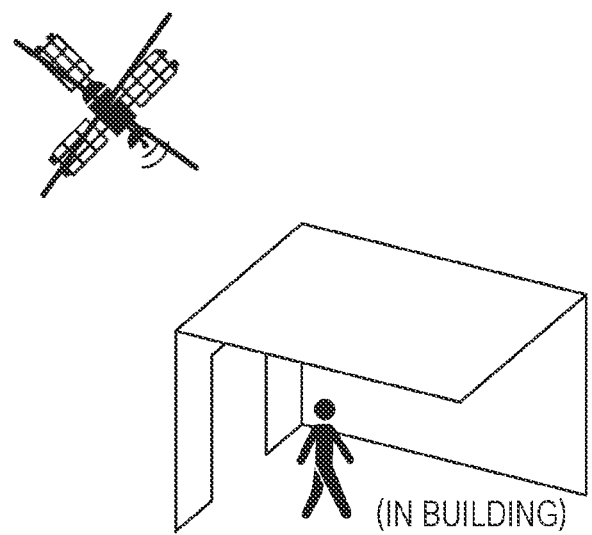
FIGS. 5A, 5B and 5C are diagrams for reference in describing an example of a method for determining whether a user is present indoors or outdoors.
Figure 5B:
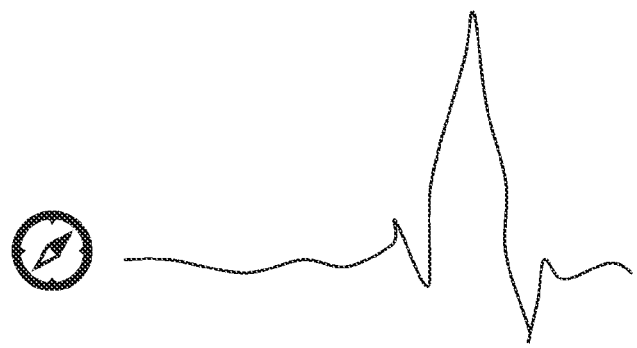
Figure 5C:
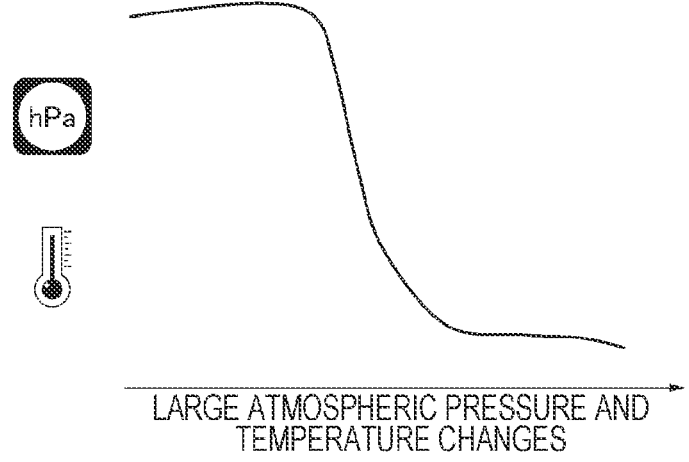

It is possible to determine whether the user U is present indoors or outdoors, on the basis of movement amount information obtained by the motion sensor. For example, as schematically illustrated in FIG. 5A, it is possible to determine whether or not a signal to be received by the GPS 23 is interrupted or whether or not a reception strength of the signal is equal to or less than a certain strength. Furthermore, as schematically illustrated in FIG. 5B, it is also possible to determine from a result of detection by the magnetism/atmospheric pressure sensor 33A that the user U is present indoors in a case where a change of a magnetism is equal to or more than a certain change. Furthermore, as illustrated in FIG. 5C, it is also possible to determine from a result of detection by the magnetism/atmospheric pressure sensor 33A that the user U is present indoors in a case where a change of an atmospheric pressure is equal to or more than a certain change. These determination methods may be combined. For example, it may be determined whether or not the user is present indoors, on the basis of a signal strength from the GPS 23 and, moreover, it may be determined from a result of detection by the magnetism/atmospheric pressure sensor 33A that which floor the user U is present in a building, using an atmospheric pressure. It is possible to determine that the user U is present indoors, in a case where a change of a temperature is equal to or more than a certain change. Furthermore, it may be determined whether or not the user U is present indoors, from another information (e.g., a change of a temperature).

Figure 6:
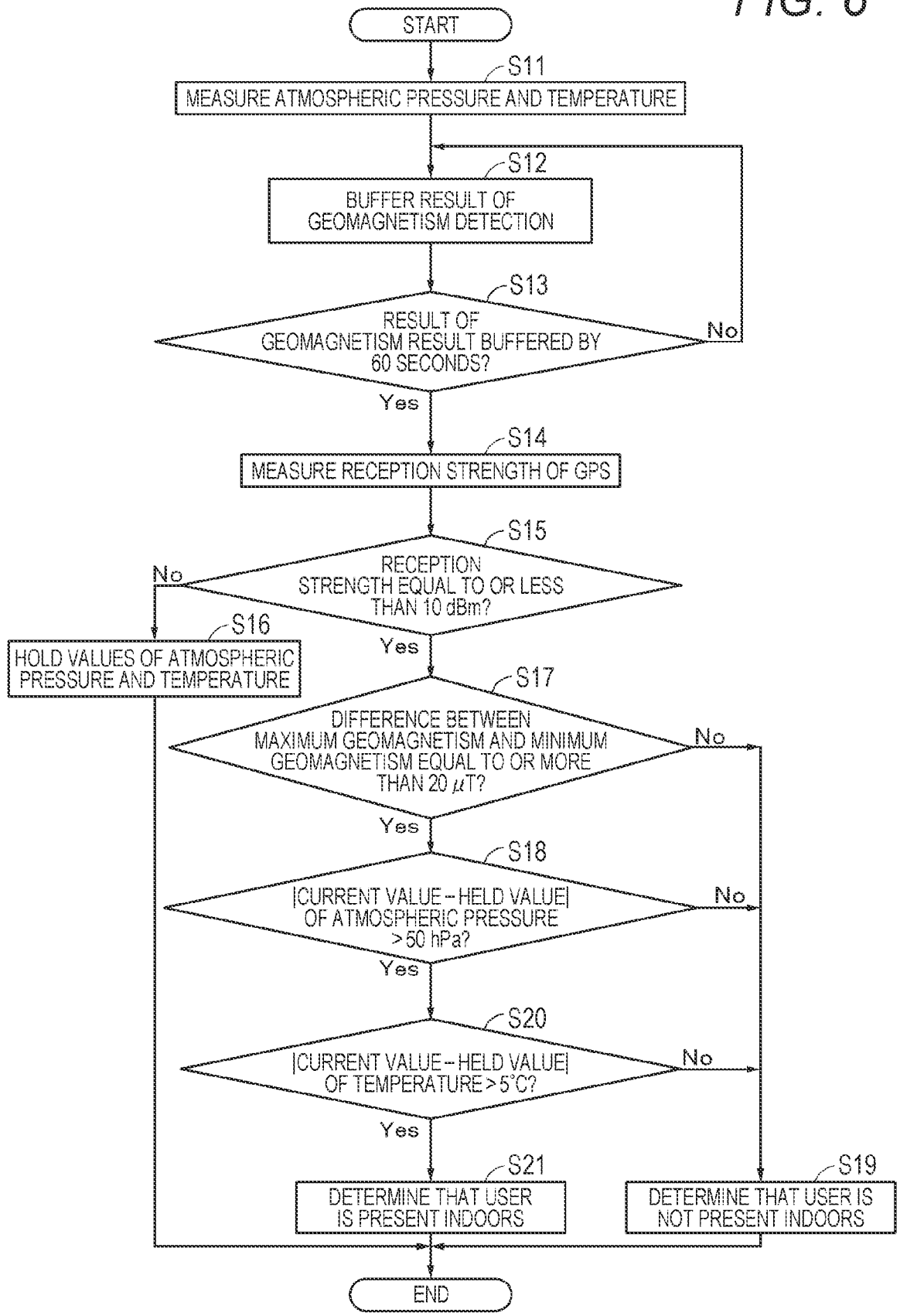
FIG. 6 is a flowchart that illustrates a flow of processing for determining whether or not a user is present indoors.

FIG. 6 is a flowchart that illustrates a flow of processing for determining whether or not the user U is present indoors. Note that the following processing is carried out by the CPU 11 unless otherwise specified.

When the processing starts, in step S11, an atmospheric pressure is measured by the magnetism/atmospheric pressure sensor 33A. Note that in this example, the smartphone 1 includes a temperature sensor, and a temperature is measured by the temperature sensor in step S11. The processing then proceeds to step S12.

In step S12, a magnetism (a geomagnetism) is detected by the magnetism/atmospheric pressure sensor 33A, and a result of the detection is buffered. The processing then proceeds to step S13.

In step S13, it is determined whether or not the result of the geomagnetism detection has been buffered by 60 seconds. In a case where the result of the geomagnetism detection has not been buffered by 60 seconds, the processing returns to step S12, and the result of the geomagnetism detection is buffered. In a case where the result of the geomagnetism detection has been buffered by 60 seconds, the processing proceeds to step S14.

In step S14, a reception strength of a signal received by the GPS 23 is measured. The processing then proceeds to step S15.

In step S15, it is determined whether or not the reception strength measured in step S14 is equal to or less than a threshold value (e.g., 10 dBm). In a case where the reception strength is not equal to or less than 10 dBm, the processing proceeds to step S16.

In a case where the reception strength of the signal received by the GPS 23 is larger than the threshold value, it is determined that the user U is present outdoors. In step S16, an outdoor atmospheric pressure and an outdoor temperature are measured and held in order to detect differences with an indoor atmospheric pressure and an indoor temperature in another processing. The processing then ends.

In a case where it is determined in step S15 that the reception strength measured in step S14 is equal to or less than the threshold value, the processing proceeds to step S17.

In step S17, it is determined whether or not a difference between a maximum value (MAX) and a minimum value (MIN) of the geomagnetism buffered in step S13 is equal to or more than a threshold value (e.g., 20 µT). In a case where the difference is less than the threshold value, the processing proceeds to step S19. In step S19, it is determined that the user U is not present indoors, that is, the user U is present outdoors.

In a case where the difference between the maximum value (MAX) and the minimum value (MIN) of the geomagnetism buffered in step S13 is equal to or more than the threshold value in the processing task of step S17, the processing proceeds to step S18.

In step S18, it is determined whether or not a difference between a current value of the atmospheric pressure measured by the magnetism/atmospheric pressure sensor 33A and a value of the atmospheric pressure held in step S16 (a held value) is larger than a threshold value (e.g., 50 hPa). In a case where the difference is equal to or less than the threshold value, the processing proceeds to step S19. In step S19, it is determined that the user U is not present indoors, that is, the user U is present outdoors.

In a case where the difference between the current value of the atmospheric pressure and the held value is larger than 50 hPa in the processing task of step S18, the processing proceeds to step S20.

In step S20, it is determined whether or not a difference between a current value of the temperature measured by the temperature sensor and a value of the temperature held in step S16 (a held value) is larger than a threshold value (e.g., 5° C.) In a case where the difference is equal to or less than the threshold value, the processing proceeds to step S19. In step S19, it is determined that the user U is not present indoors, that is, the user U is present outdoors.

In a case where the difference between the current value of the temperature and the held value is larger than 5° C. in the processing task of step S20, the processing proceeds to step S21. In step S21, it is determined that the user U is present indoors.

As described above, it is determined whether or not the user U is present indoors, by the illustrated flow of the processing. Then, in a case where it is determined that the user U is present indoors, the output of the movement amount information is restricted. Therefore, it is possible to prevent the structure of the indoor area treated with high confidentiality from being acquired by the malicious user.

Modification of Second Example

Note that the foregoing first example and second example can be combined. For example, in a case where it is detected that the movement of the user U who is present indoors is equal to or more than a certain movement, the external output of the movement amount information may be restricted.

Figure 7:
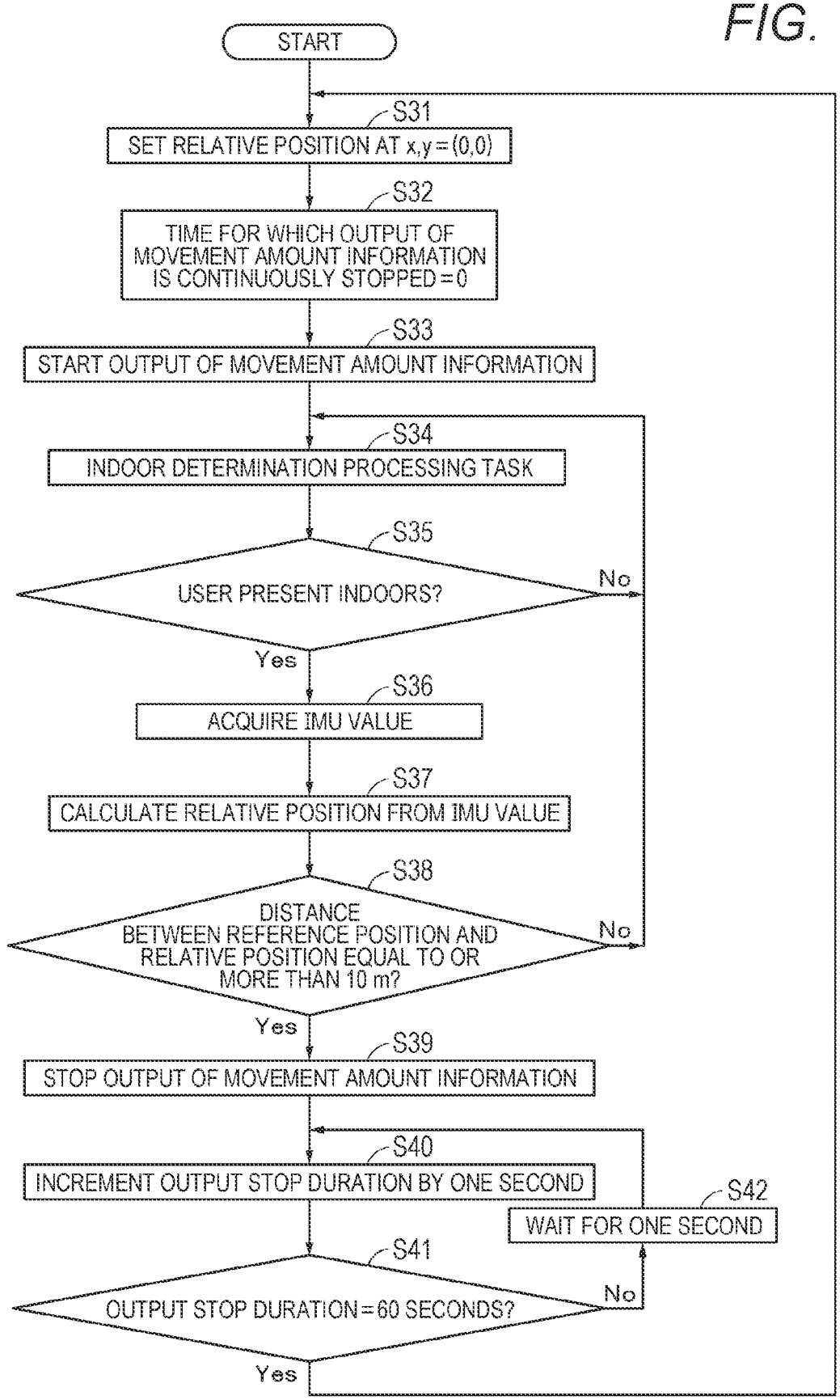
FIG. 7 is a flowchart that illustrates a flow of processing carried out in a modification of a second example of the embodiment.

FIG. 7 is a flowchart that illustrates a flow of processing according to a modification of the second example. Note that the following processing is carried out by the CPU 11 unless otherwise specified.

When the processing starts, in step S31, a value of a relative position to a reference position (e.g., a value on an x, y coordinate system (which may include coordinates in a heightwise direction (a z direction))) is reset. The processing then proceeds to step S32.

In step S32, a time for which the output of the movement amount information is restricted, for example, a time for which the output of the movement amount information to the outside of the smartphone 1 is stopped (hereinafter, appropriately referred to as an output stop duration) is reset to 0. The processing then proceeds to step S33.

In step S33, the external output of the movement amount information is started. The processing then proceeds to step S34.

In step S34, an indoor determination processing task of determining whether or not the user U is present indoors is carried out. The contents of the indoor determination processing task are, for example, the processing tasks illustrated in the flowchart of FIG. 6. The processing then proceeds to step S35.

In step S35, it is determined whether or not the user U is present indoors, as a result of the indoor determination processing task in step S34. In a case where it is determined as a result of the indoor determination processing task that the user U is not present indoors, the processing returns to step S34. In a case where it is determined as a result of the indoor determination processing task that the user U is present indoors, the processing proceeds to step S36. Note that a position of the user U in the case where it is determined that the user U is present indoors is set as a reference position.

In step S36, the CPU 11 acquires an IMU value output from the IMU 30. The processing then proceeds to step S37.

In step S37, the CPU 11 calculates a relative position from the reference position on the basis of the acquired IMU value. The processing then proceeds to step S38.

In step S38, it is determined whether or not the relative position to the reference position is equal to or more than 10 m. In a case where the relative position to the reference position is not equal to or more than 10 m, the processing returns to step S34. In a case where the relative position to the reference position is equal to or more than 10 m, the processing proceeds to step S39.

In step S39, since a movement of the user U, which is equal to or more than a certain movement, is detected, the output of the movement amount information is stopped. The processing then proceeds to step S40.

In step S40, the output stop duration is incremented by one second. The processing then proceeds to step S41.

In step S41, it is determined whether or not the output stop duration is 60 seconds (one minute). In a case where the output duration is not 60 seconds, the processing proceeds to step S42.

In step S42, processing of waiting for one second is carried out. Specifically, the processing returns to step S40 in which the output stop duration is incremented by one second.

In a case where the output stop duration reaches 60 seconds, the processing returns to step S31. Then, after the reset of the relative position and output stop duration, the output of the movement amount information is resumed. Note that the output of the movement amount information may be resumed, for example, in a case where the number of steps of the user U becomes equal to or more than 100 or in a case where a moving distance of the user U becomes equal to or more than 50 m after the stop of the output of the movement amount information.

Third Example

Outline of Third Example

A third example is an example capable of restricting output of movement amount information (specifically, output of movement amount information to the outside of the smartphone 1), in accordance with permission information indicating that the output is permitted or prohibited. Specifically, the permission information is information that contains a movement amount information public setting which is a setting that an entity which owns a right of an indoor area or the like permits or prohibits generation or publication of indoor movement amount information (internal movement amount information) by the external output of the movement amount information.

Figure 8:
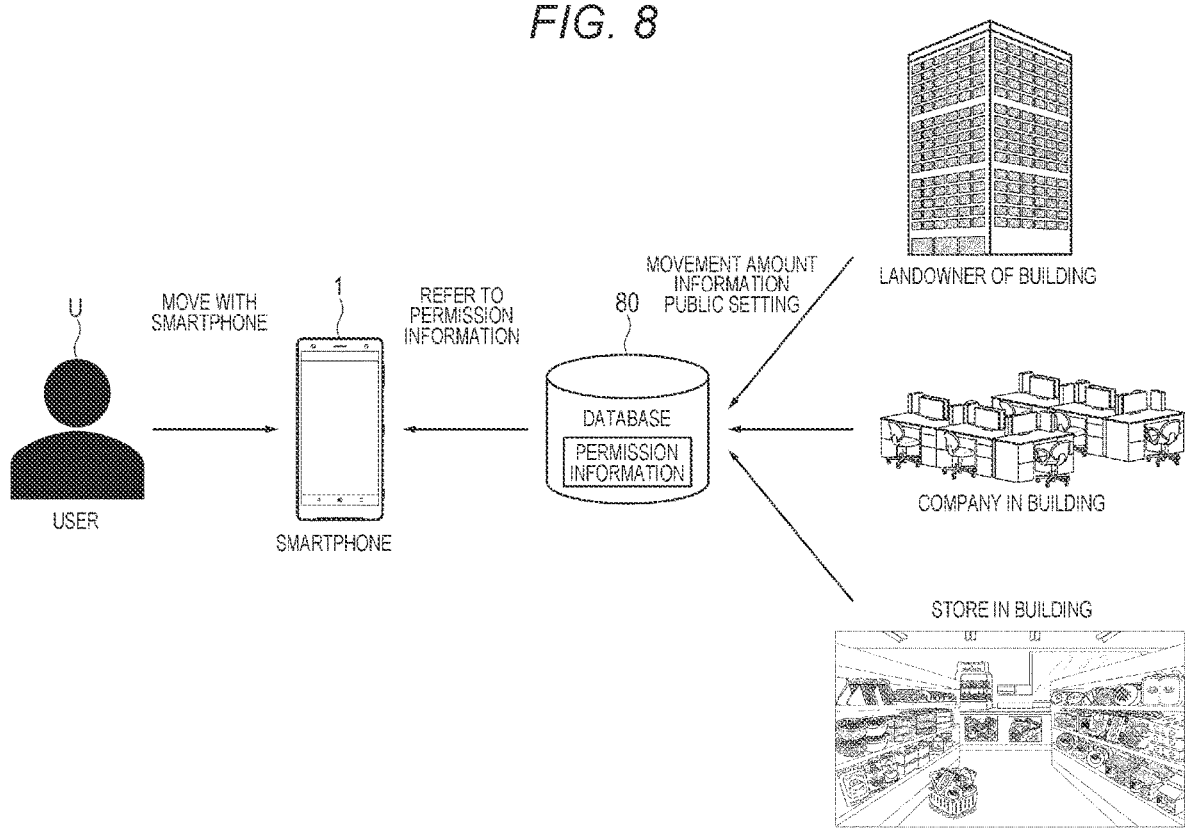
FIG. 8 is a diagram for reference in describing an outline of a third example of the embodiment.

With reference to FIGS. 8 to 13, a schematic description will be given of the third example. As illustrated in FIG. 8, it is assumed that the entity which performs the movement amount information public setting is a landowner of a building, a company in the building, a store in the building, or the like. As a matter of course, a residents' management association of an apartment, a unit owner of the apartment, a landowner of a house, or the like may be the entity which performs the movement amount information public setting, in addition to the assumed entity.

Permission information containing a movement amount information public setting set by each entity is stored in a database 80. The database 80 is, for example, a database of a cloud server. The smartphone 1 carried by the user U acquires the permission information from the database 80 through communication. Then, the permission information is analyzed by the smartphone 1, and the movement amount information public setting for the current position of the smartphone 1 is discriminated. As a result of the discrimination, if the content of the movement amount information public setting is "OK", the external output of the movement amount information is permitted. If the content of the movement amount information public setting is "NG", the external output of the movement amount information is restricted.

Figure 9:
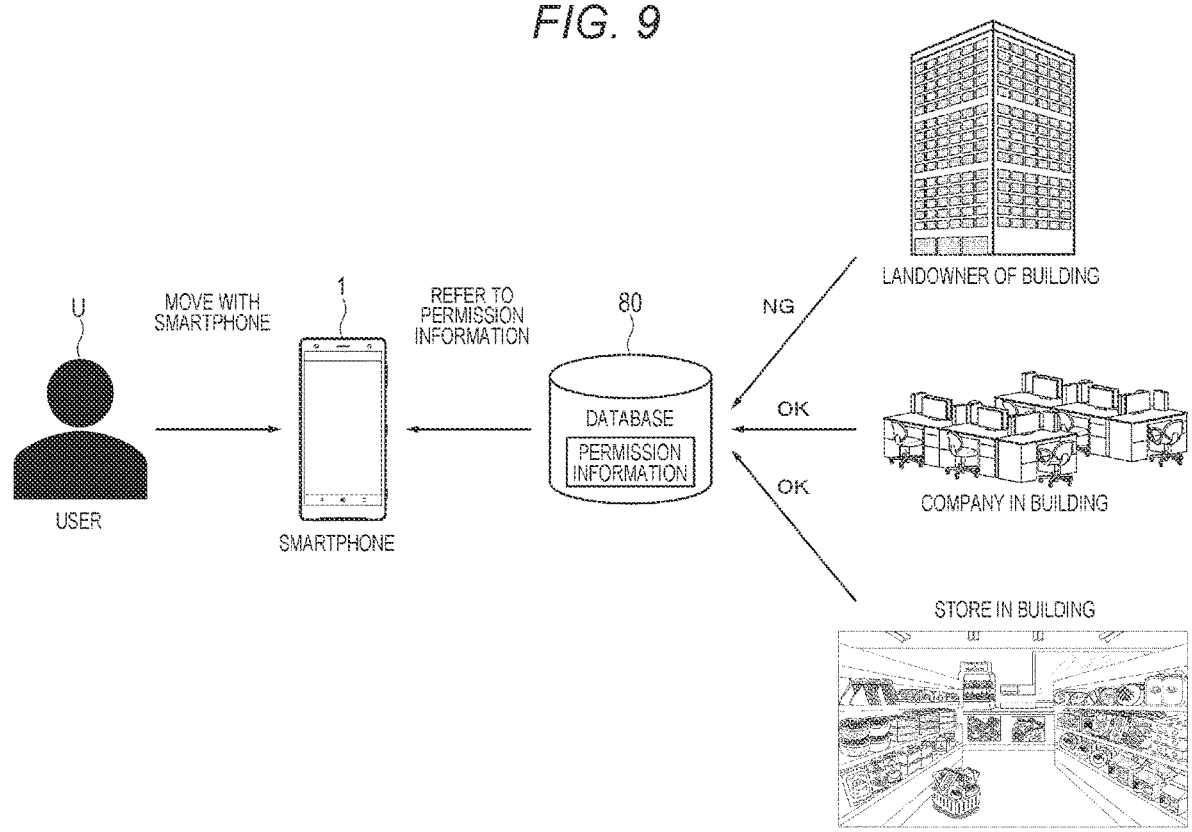
FIG. 9 is a diagram for reference in describing the outline of the third example of the embodiment.

Even in the same position coordinates, different movement amount information public settings can be set by business entities and the like on the position coordinates. For example, as illustrated in FIG. 9, even in a building on the same position coordinates, a landowner of the building sets "NG" as a movement amount information public setting while a company in the building and a store in the building each set "OK" as a movement amount information public setting in some cases. In such a case, processing in which the movement amount information public setting of the building is "NG" is carried out in deference to an intention of the landowner of the building, which is a higher right holder. In other words, the external output of the movement amount information is restricted even in a case where the user U carrying the smartphone 1 is present in a floor of a company or a floor of a store where the movement amount information public setting is set at "OK".

Figure 10:
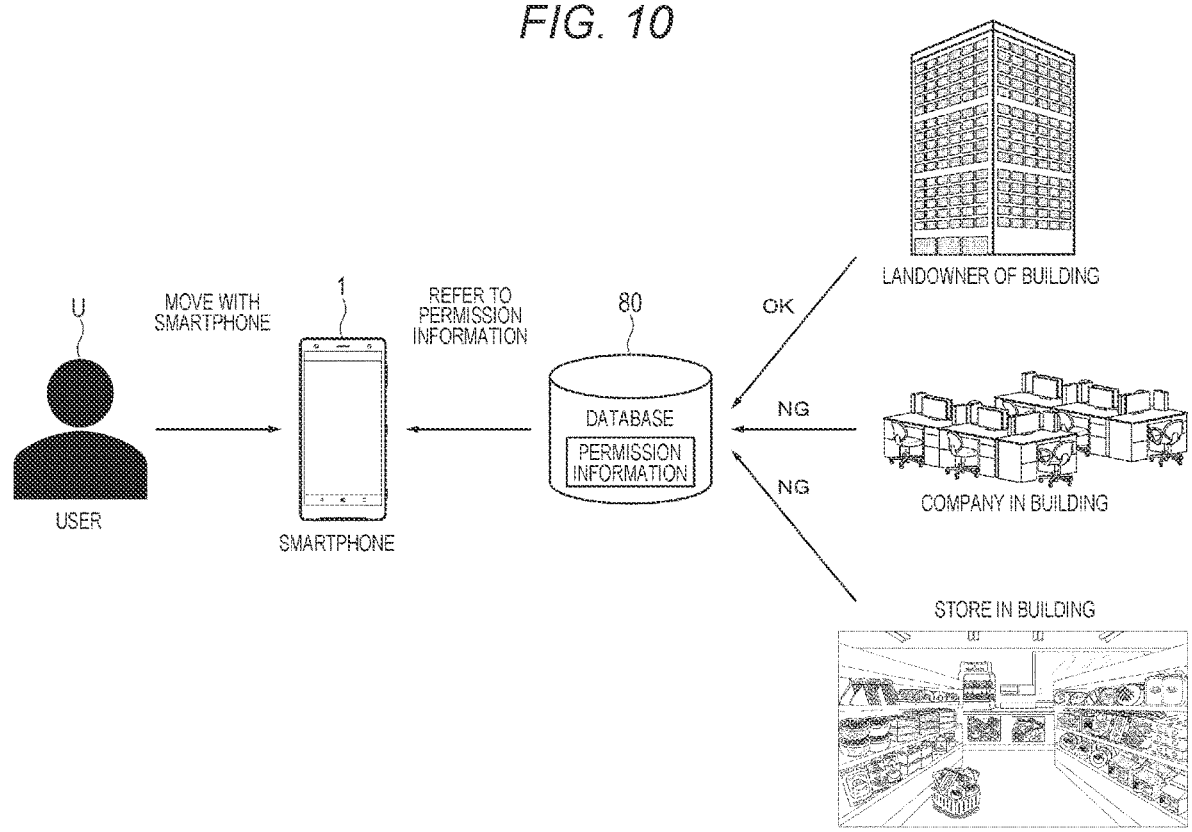
FIG. 10 is a diagram for reference in describing the outline of the third example of the embodiment.

Furthermore, as illustrated in FIG. 10, all the tenants in the building set the movement amount information public setting at "NG" in some cases although the landowner of the building sets the movement amount information public setting at "OK". In this case, as in the example illustrated in FIG. 9, in a case where the user U carrying the smartphone 1 is present in the building, the external output of the movement amount information is restricted.

Figure 11:
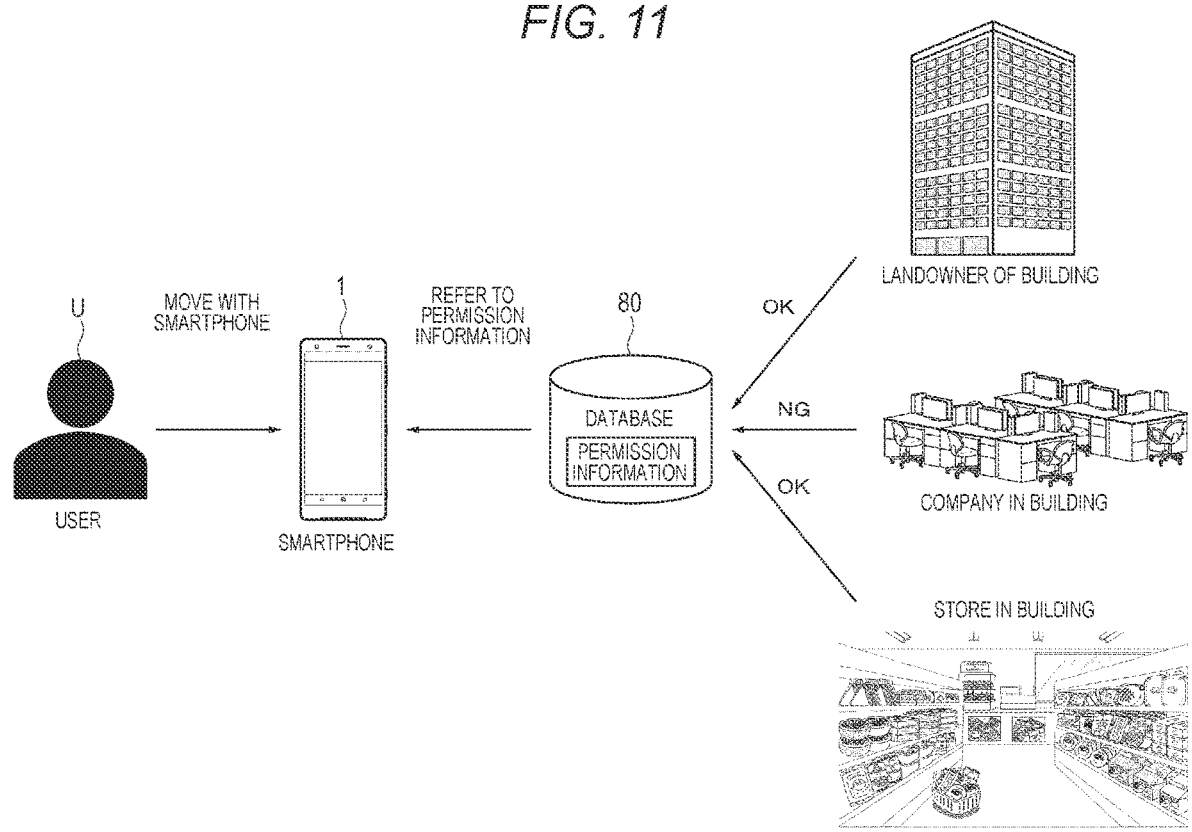
FIG. 11 is a diagram for reference in describing the outline of the third example of the embodiment.

Furthermore, as illustrated in FIG. 11, only some of the tenants in the building (e.g., a company in the building) set the movement amount information public setting at "NG" in some cases. In this case, only in a case where the user U carrying the smartphone 1 is present in the floor of the relevant company, the external output of the movement amount information is restricted. Whether or not the user U is present in the floor of the relevant company can be discriminated by, for example, a value of an atmospheric pressure acquired by the magnetism/atmospheric pressure sensor 33A.

Example of Permission Information

FIG. 12 illustrates an example of permission information. The permission information contains, as items, a name of a building, an entity which performs a movement amount information public setting (a landowner, a tenant, a lessee, or the like as a specific example), a position of the building, a floor in the building, a movement amount information public setting, remarks, and a description concerning the movement amount information public setting. Some of the above items (e.g., the remarks and the description concerning the movement amount information public setting) may be omitted.

Figure 13:
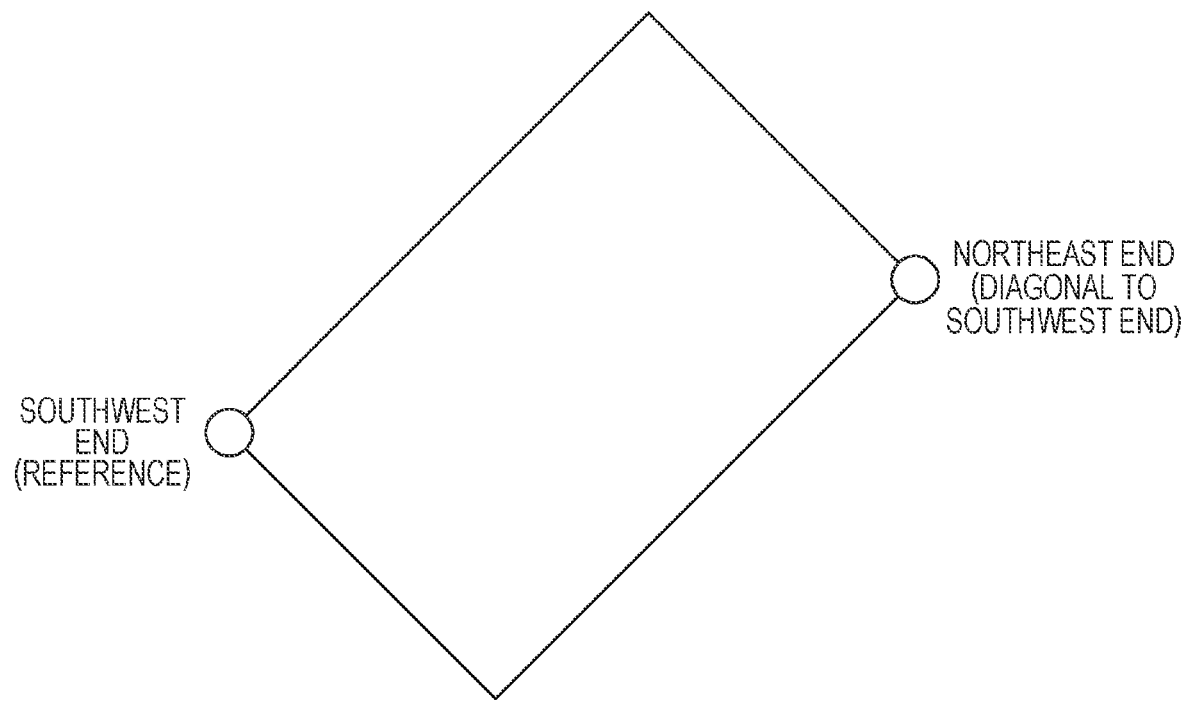
FIG. 13 is a diagram for reference in describing an example of position information of a building according to the embodiment.

The position of the building is defined by, for example, latitude and longitude. In a case of a large building, it may be difficult to determine whether or not the user U approaches the building, only by the center coordinates of the building. As schematically illustrated in FIG. 13, hence, in the present embodiment, a position of the building is defined by latitude and longitude at each of an end (a southwest end) of the building and an end (a northeast end) diagonal to the southwest end. Note that FIG. 13 is a diagram of a building contained in permission information (e.g., "abc" building) as seen from above.

In a case of a small building, only the center coordinates may be described in permission information. In this case, identical coordinates may be described as coordinates of two ends.

Specific Processing Example in Third Example

Figure 14:
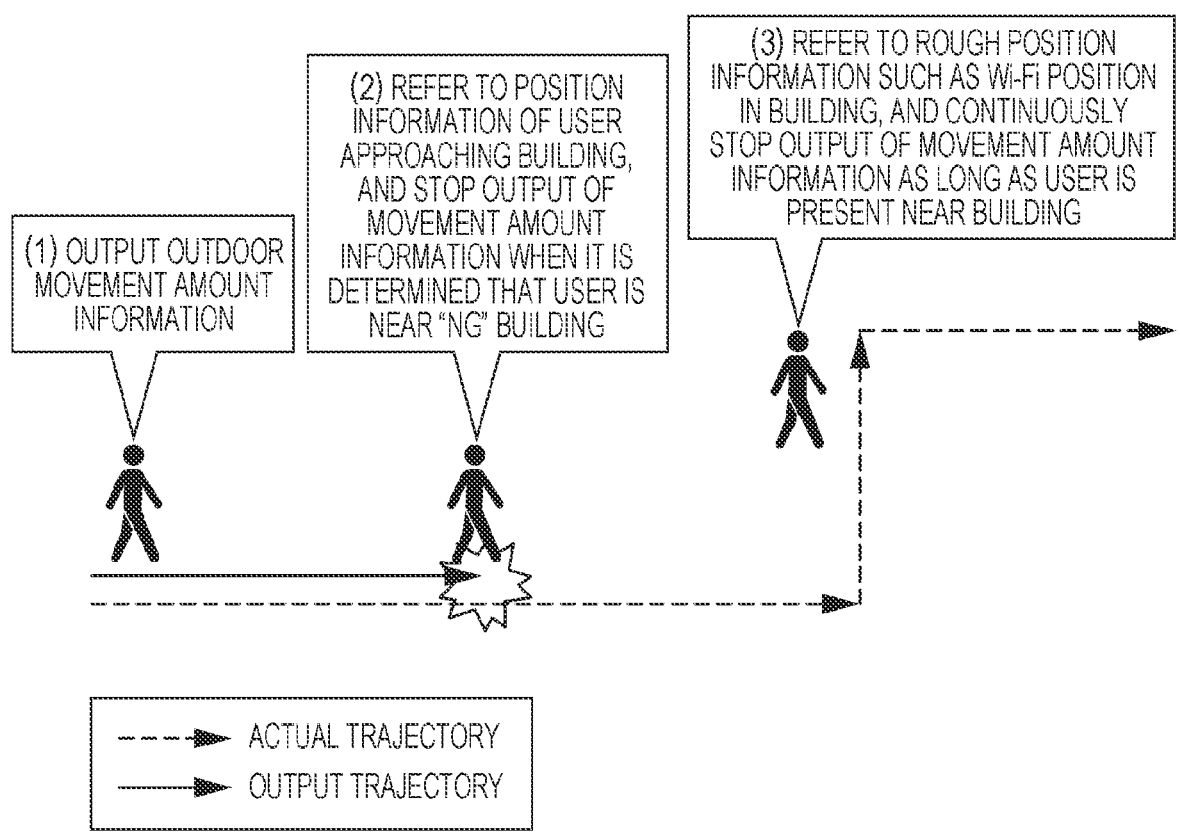
FIG. 14 is a diagram for reference in describing a specific processing example in the third example of the embodiment.

FIGS. 14 to 17 are diagrams each illustrating a specific example of processing in the third example. As illustrated in FIG. 14, in this example, for example, in a case where the user U is present outdoors, the movement amount information is output. Then, when the user U approaches a predetermined building, position information of the building which the user U approaches is discriminated by reference to position information acquired by the GPS 23. The CPU 11 of the smartphone 1 refers to the permission information stored in the database 80 to discriminate a movement amount information public setting associated with the position information of the building which the user U approaches. Here, in a case where the movement amount information public setting is "NG", the external output of the movement amount information is restricted by the control of the CPU 11. Note that in a case where the movement amount information public setting of the building which the user U approaches is not contained in the permission information, the external output of the movement amount information may be restricted on the assumption that the movement amount information public setting of the building is "NG" from the viewpoint of securing confidentiality.

When the user U enters the building, it is determined whether or not the user U is present in the building, by reference to rough position information based on information of Wi-Fi, or the like. For example, it is possible to discriminate approximate position information of the user U on the basis of position information of an access point of Wi-Fi and an electric wave strength of a beacon signal. Then, as a result of the discrimination, while the user U stays the building, the external output of the movement amount information is continuously stopped.

Figure 15:
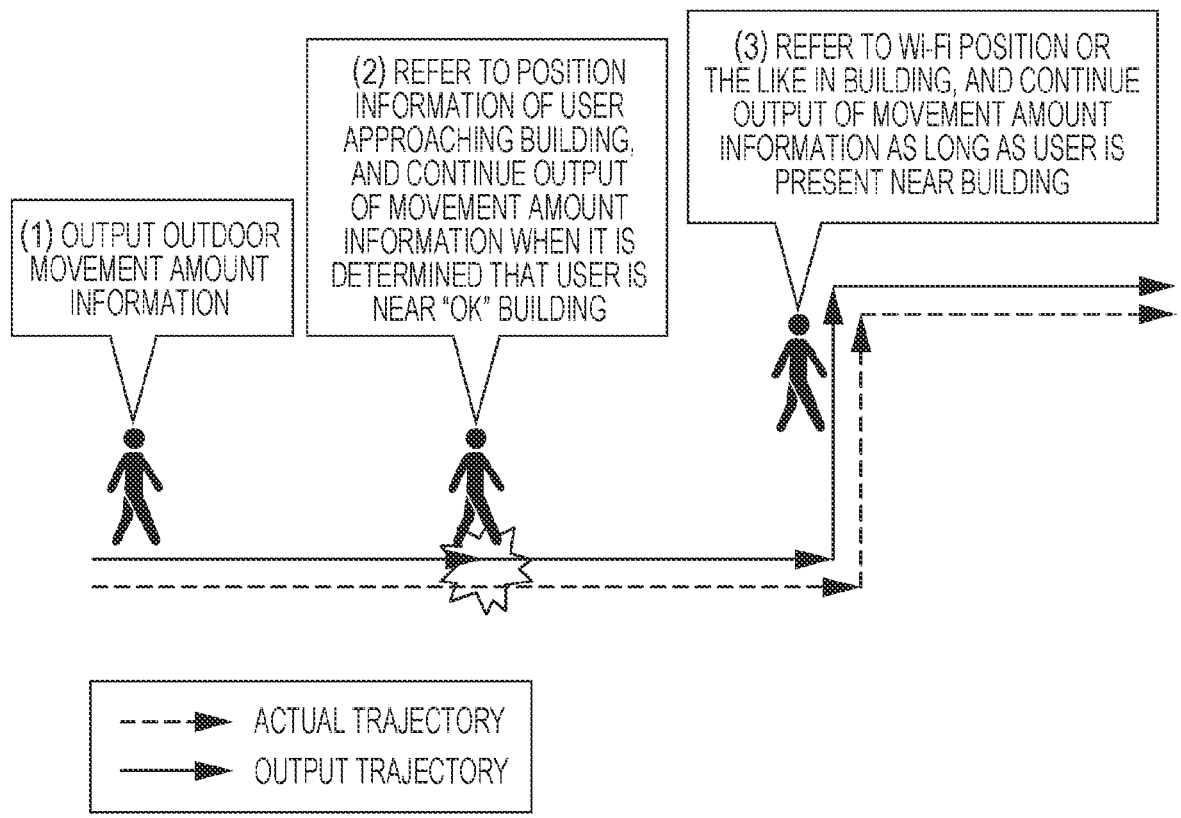
FIG. 15 is a diagram for reference in describing a specific processing example in the third example of the embodiment.
Figure 16:
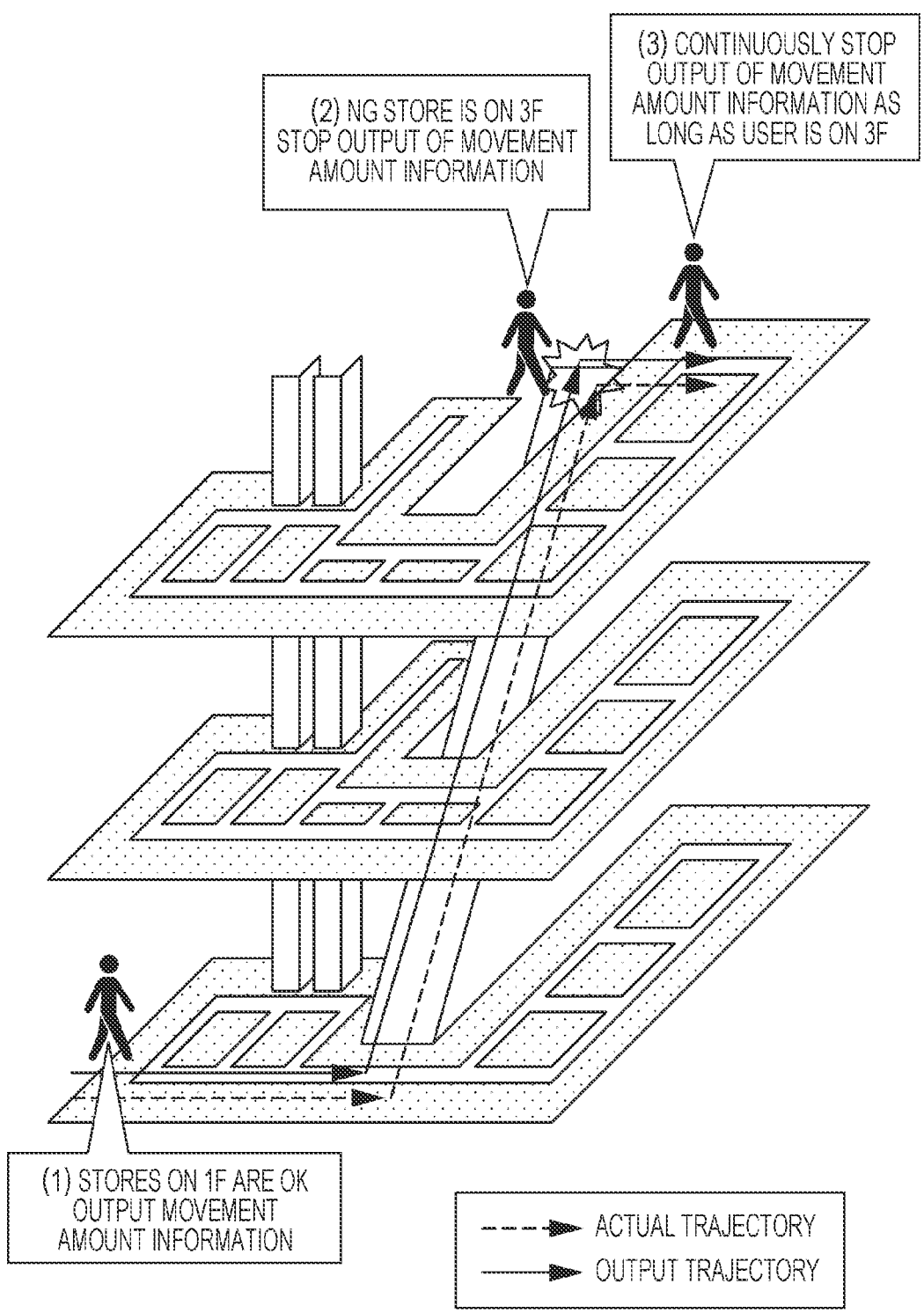
FIG. 16 is a diagram for reference in describing a specific processing example in the third example of the embodiment.

Furthermore, as illustrated in FIG. 15, in a case where the movement amount information public setting of the building which the user U approaches is "OK", the external output of the movement amount information is not restricted even in the case where the user U is present in the building, and the movement amount information is output externally.

Furthermore, as described above, only stores on some of the floors in the building set the movement amount information public setting at "NG" in some cases. For example, it is considered that "OK" is set as a movement amount information public setting for a store on a first floor while "NG" is set as a movement amount information public setting for a store on a third floor even in the same building as illustrated in, for example, FIG. 16. In this case, in a case where the user U carrying the smartphone 1 is on the first floor, the movement amount information is output externally. Then, when it is detected that the user U moves to the third floor, the external output of the movement amount information is restricted. Note that the movement of the user U from the first floor to the third floor can be determined from an atmospheric pressure acquired by the magnetism/atmospheric pressure sensor 33A.

Figure 17:
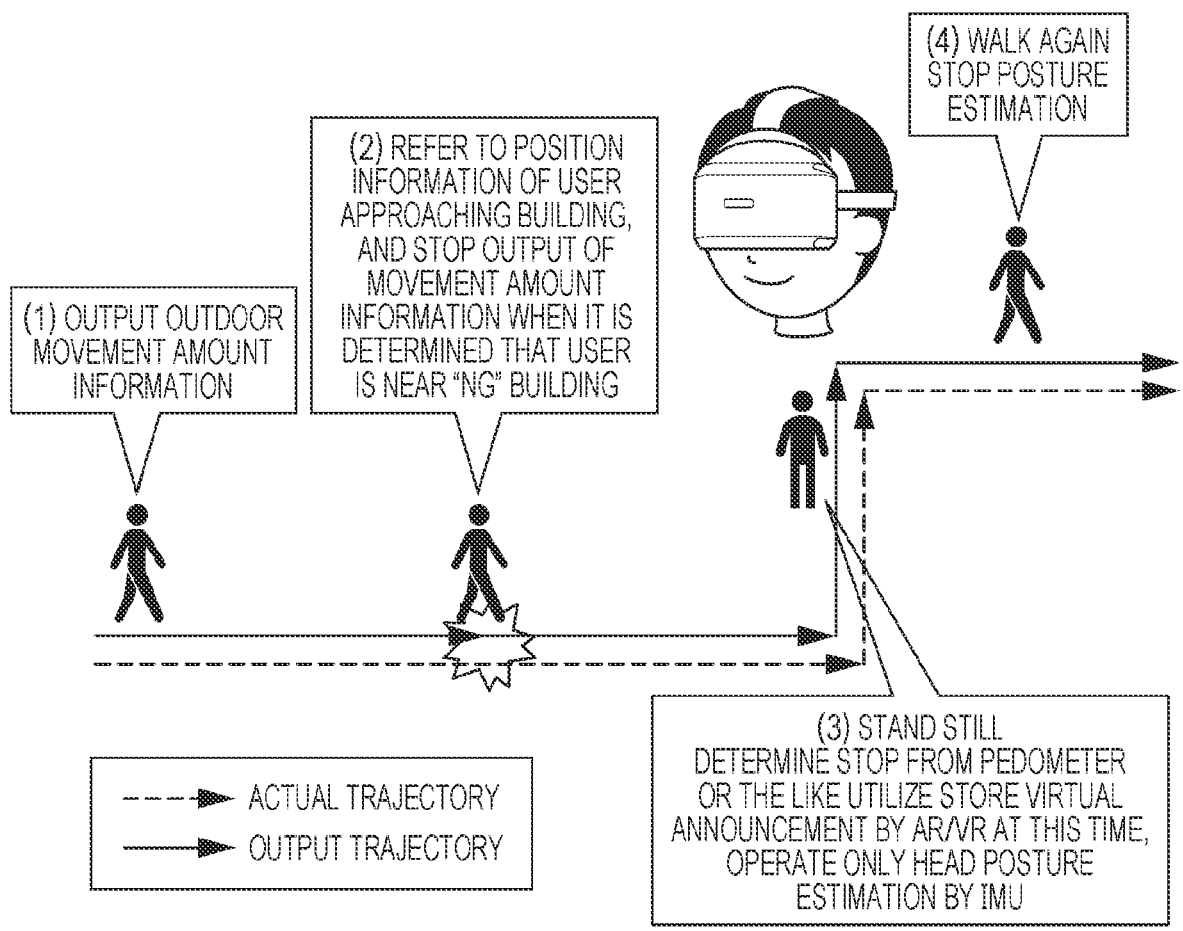
FIG. 17 is a diagram for reference in describing a specific processing example in the third example.

Note that, as described in the first example, the IMU 30 may be incorporated in an HUD or the like rather than the smartphone 1. Using information output from the IMU 30, for example, a virtual advertisement of a store is displayed by processing according to AR or VR. Therefore, as illustrated in FIG. 17, for example, in a case where it is detected that the user U stands still, on the basis of a result of measurement by a pedometer that can be embodied by the acceleration sensor 31A, the external output of the movement amount information may be permitted. Specifically, a restriction to generation of an IMU value by the IMU 30, which is an aspect of a restriction, is removed. Then, a posture of the wearer's head is estimated on the basis of the IMU value output from the IMU 30. Then, when the movement of the user U is detected again, the head posture estimation processing is stopped in such a manner that the operation of the IMU 30 is stopped, for example.

Flow of Processing Carried Out in Third Example

Figure 18:
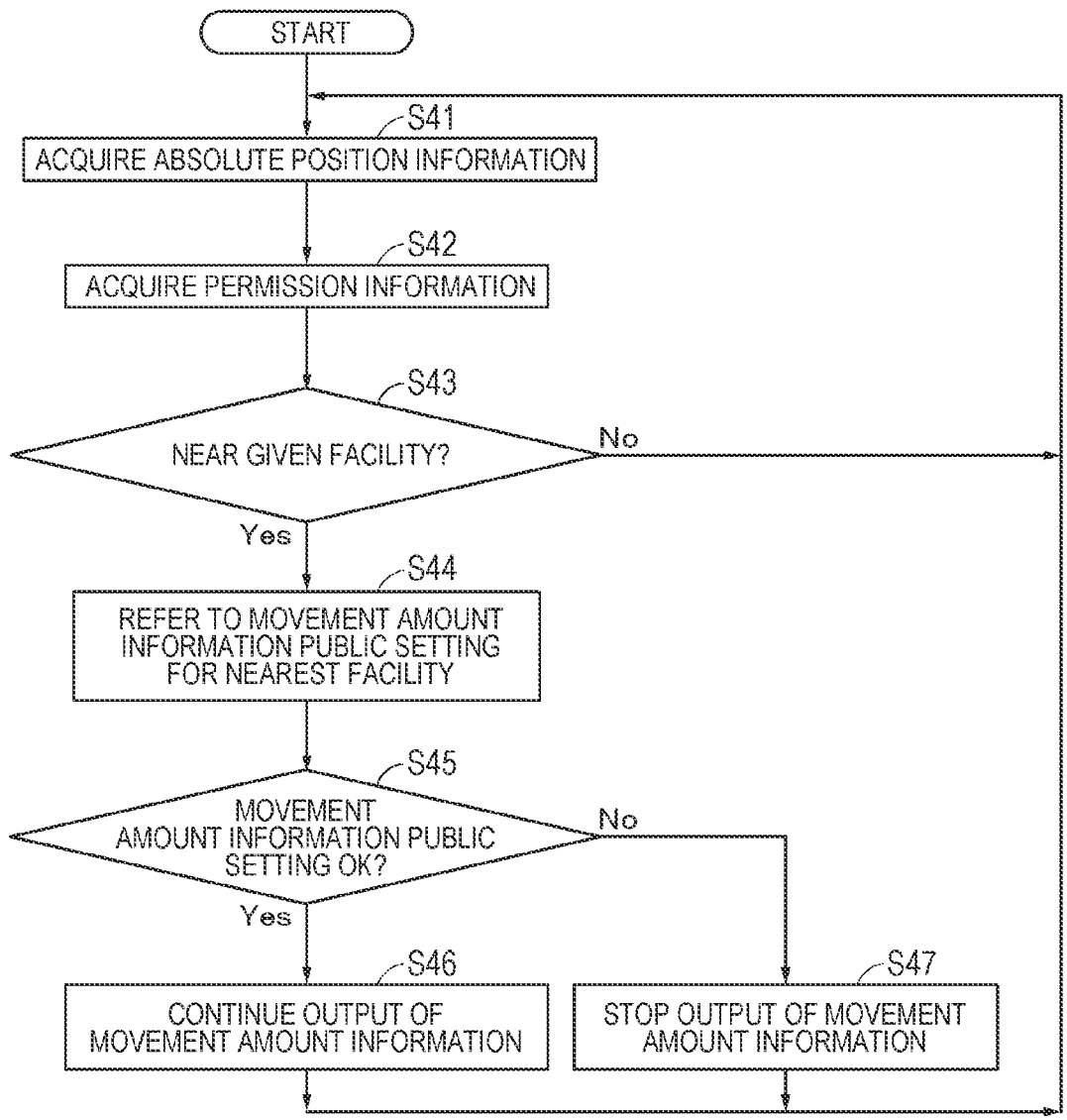
FIG. 18 is a flowchart that illustrates a flow of processing carried out in the third example of the embodiment.

FIG. 18 is a flowchart that illustrates an example of a flow of processing carried out in the third example. In step S41, absolute position information of the smartphone 1 is acquired on the basis of a signal received by the GPS 23 of the smartphone 1, or the like. Note that, in a case where the user U carrying the smartphone 1 is present outdoors, the movement amount information is output externally. The processing then proceeds to step S42.

In step S42, permission information is acquired by the smartphone 1. The processing then proceeds to step S43.

In step S43, it is discriminated whether or not the user U is present near a given facility, on the basis of the absolute position information acquired in step S41. In a case where the user U is not present near the given facility, the processing returns to step S41. In a case where the user U is present near the given facility, the processing proceeds to step S44.

In step S44, the CPU 11 of the smartphone 1 refers to the permission information, specifically, a movement amount information public setting for a facility nearest to the user U. The processing then proceeds to step S45.

In step S45, it is determined whether or not the movement amount information public setting is "OK", on the basis of a result of the reference to the movement amount information public setting by the CPU 11. Here, in a case where the movement amount information public setting is "OK", the processing proceeds to step S46.

In step S46, the external output of the movement amount information is continued. The processing then returns to step S41.

As a result of the determination processing task in step S45, in a case where the movement amount information public setting is "NG", the processing proceeds to step S47.

In step S47, the external output of the movement amount information is stopped. The processing then returns to step S41.

Note that a movement amount information public setting for a floor of a building or a predetermined section of a building, rather than a movement amount information public setting on a building basis, may be determined.

Modification of Third Example

Figure 19:
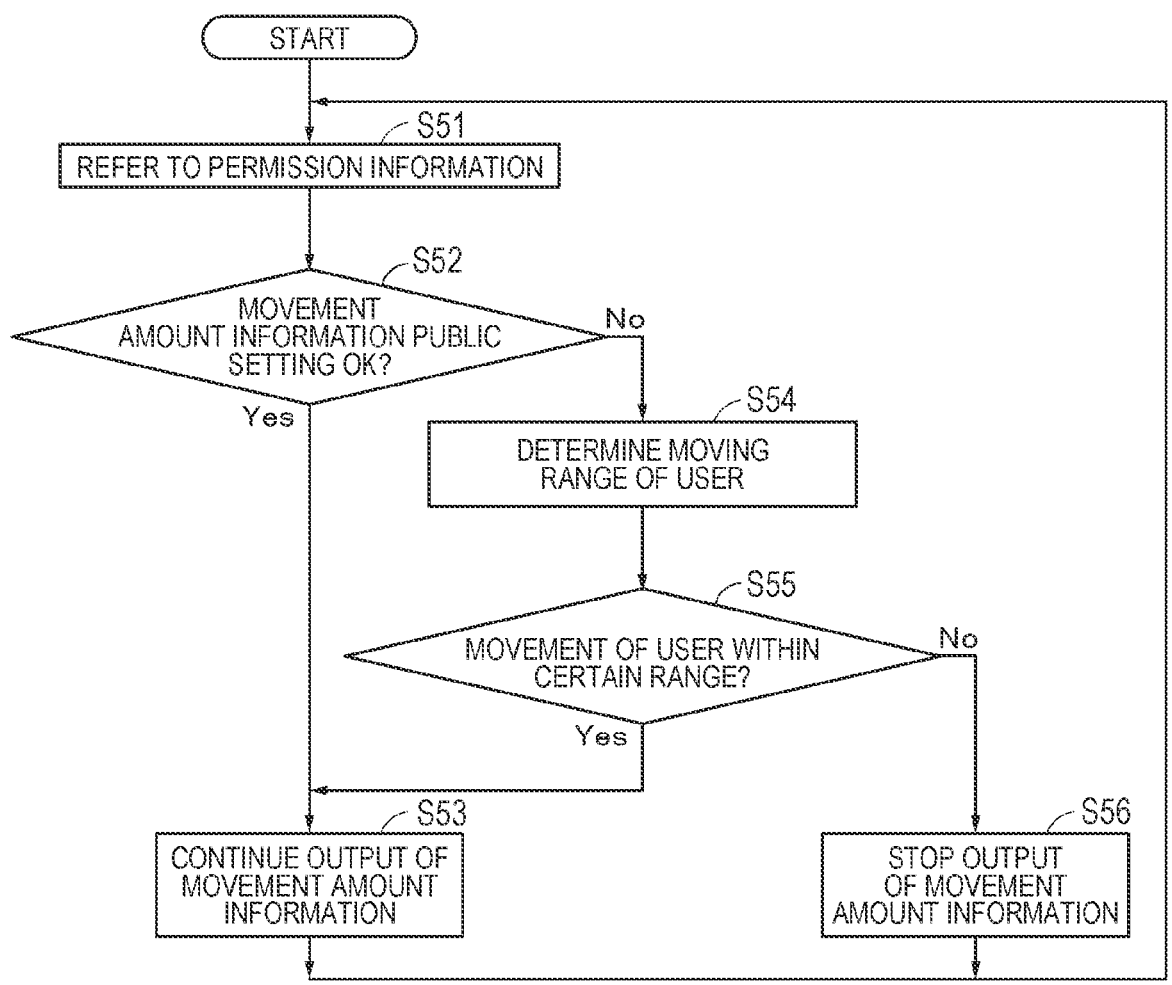
FIG. 19 is a flowchart that illustrates a flow of processing carried out in a modification of the third example of the embodiment.

The foregoing processing in the third example can be combined with, for example, the processing in the first example. FIG. 19 is a flowchart that illustrates a flow of processing according to a modification of the third example.

When the processing starts, in step S51, permission information is acquired by the CPU 11 of the smartphone 1. The processing then proceeds to step S52.

In step S52, the CPU 11 refers to a movement amount information public setting in the permission information to determine whether or not the movement amount information public setting is "OK". In a case where the movement amount information public setting is "OK", the processing proceeds to step S53. In step S53, the output of the movement amount information is continued. The processing then returns to step S51.

In the determination processing task in step S52, in a case where the movement amount information public setting is "NG", the processing proceeds to step S54. In step S54, a moving range is determined with respect to a current position of the user U. When the moving range is within a threshold value (e.g., 10 m), the processing proceeds to step S53 in which the output of the movement amount information is continued. The processing then returns to step S51.

In a case where the moving range is larger than the threshold value (e.g., 10 m), the processing proceeds to step S56 in which the output of the movement amount information is stopped. The processing then returns to step S51.

According to the present embodiment described above, it is possible to appropriately restrict output of movement amount information. It is accordingly possible to prevent movement amount information of a user from being acquired by a malicious user.

Modification

The embodiment of the present disclosure has been described in detail above; however, the contents of the present disclosure are not limited to the foregoing embodiment, and various modifications can be made on the basis of the technical idea of the present disclosure.

The information processing apparatus according to the embodiment is not limited to a smartphone, and may be a tablet-type computer or a wearable device.

In the foregoing embodiment, the motion of a user exceeding a certain level may be determined from a standard deviation value of position distributions indicating a magnitude of a movement amount, or the like, rather than a movement amount itself.

In the foregoing processing, some of the processing tasks may be carried out in different order from the foregoing order or some of the processing tasks may be carried out in parallel.

The present disclosure can also be embodied by an apparatus, a method, a program, a system, and the like. For example, a program for achieving the functions described in the foregoing embodiment is set to be downloadable, and an apparatus not having the functions described in the embodiment downloads and installs the program, so that the control described in the embodiment can be achieved by the apparatus. The present disclosure can also be embodied by a server that distributes such a program. Furthermore, the matters described in the embodiment and modification can be combined as appropriate.

Note that the contents of the present disclosure are not limitedly interpreted by the illustrative effects in the present disclosure.

The present disclosure may adopt the following configurations.

(1)

An information processing apparatus including
  a control unit configured to restrict, on the basis of movement amount information obtained from a motion sensor, output of the movement amount information.

(2)

The information processing apparatus as recited in (1), in which
  the control unit determines whether or not the motion sensor is located in an indoor area and, in a case where the motion sensor is located in the indoor area, restricts the output of the movement amount information.

(3)

The information processing apparatus as recited in (1), in which
  the control unit acquires permission information containing a setting to permit or prohibit the output of the movement amount information in a predetermined indoor area, refers to the permission information, and restricts the output of the movement amount information.

(4)

The information processing apparatus as recited in (3), in which
  in a case where the output of the movement amount information in the predetermined indoor area is set to be prohibited by the permission information, the control unit restricts the output of the movement amount information irrespective of a moving distance.

(5)

The information processing apparatus as recited in (4), in which
  in a case where a stop state is detected by the motion sensor, the control unit removes the restriction to the output of the movement amount information.

(6)

The information processing apparatus as recited in (5), in which in a case where a moving state is detected again by the motion sensor, the control unit restricts the output of the movement amount information.

(7)

The information processing apparatus as recited in any of (3) to (6), in which the permission information contains, for each floor of the predetermined indoor area, information in which the output of the movement amount information is set to be permitted or prohibited.

(8)

The information processing apparatus as recited in any of (1) to (7), in which the control unit stops external output of the movement amount information.

(9)

The information processing apparatus as recited in any of (1) to (7), in which the control unit invalidates the movement amount information and outputs the movement amount information externally.

(10)

The information processing apparatus as recited in any of (1) to (9), in which the movement amount information contains a value output from an IMU or information based on the value output from the IMU.

(11)

An information processing method including causing a control unit to restrict, on the basis of movement amount information obtained from a motion sensor, output of the movement amount information.

(12)

A program causing a computer to execute an information processing method including causing a control unit to restrict, on the basis of movement amount information obtained from a motion sensor, output of the movement amount information.

REFERENCE SIGNS LIST

1 Smartphone
10 Control unit
30 IMU
31A Acceleration sensor
32A Gyro sensor
33A Magnetism/atmospheric pressure sensor

The invention claimed is:

1. An information processing apparatus, comprising:
a motion sensor configured to obtain movement amount information; and
a processor configured to:
 set a reference position;
 detect a movement from the reference position based on the movement amount information; and
 restrict output of the movement amount information, wherein the output of the movement amount information is restricted based on the detection of the movement from the reference position.

2. The information processing apparatus according to claim 1, wherein the processor is further configured to:
determine that the motion sensor is located in an indoor area; and
restrict the output of the movement amount information based on the determination that the motion sensor is located in the indoor area.

3. The information processing apparatus according to claim 1, wherein the processor is further configured to acquire permission information, and wherein the permission information contains a setting to permit or prohibit the output of the movement amount information in a determined indoor area.

4. The information processing apparatus according to claim 3, wherein
in a case where the output of the movement amount information in the determined indoor area is set to be prohibited by the permission information, the processor is further configured to restrict the output of the movement amount information irrespective of the detection of the movement.

5. The information processing apparatus according to claim 4, wherein
the motion sensor is further configured to detect a stop state; and
the processor is further configured to remove the restriction to the output of the movement amount information based on the detection of the stop state.

6. The information processing apparatus according to claim 5, wherein
the motion sensor is further configured to detect a moving state; and
the processor is further configured to restrict the output of the movement amount information based on the detection of the moving state.

7. The information processing apparatus according to claim 3, wherein the permission information further contains, for each floor of the determined indoor area, information in which the output of the movement amount information is set to be permitted or prohibited.

8. The information processing apparatus according to claim 1, wherein the processor is further configured to stop external output of the movement amount information.

9. The information processing apparatus according to claim 1, wherein the processor is further configured to:
invalidate the movement amount information; and
output the invalidated movement amount information externally.

10. The information processing apparatus according to claim 1, wherein the movement amount information contains a value output from an inertial measurement unit (IMU) or information based on the value output from the IMU.

11. The information processing apparatus according to claim 1, wherein the processor is further configured to:
permit the output of the movement amount information in a case where the detection of the movement is within a threshold range from the reference position; and
restrict the output of the movement amount information in a case where the detection of the movement is out of the threshold range from the reference position.

12. An information processing method, comprising:
obtaining, by a motion sensor, movement amount information;
setting, by a processor, a reference position;
detecting, by the processor, a movement from the reference position based on the movement amount information; and
restricting, by the processor, output of the movement amount information, wherein the output of the movement amount information is restricted based on the detection of the movement from the reference position.

13. A non-transitory computer-readable medium having stored thereon computer-executable instructions, which when executed by an information processing device, cause the information processing device to execute operations, the operations comprising:
- obtaining, by a motion sensor, movement amount information;
- setting, by a processor, a reference position;
- detecting, by the processor, a movement from the reference position based on the movement amount information; and
- restricting, by the processor, output of the movement amount information,
- wherein the output of the movement amount information is restricted based on the detection of the movement from the reference position.

* * * * *